United States Patent [19]
Bernstein et al.

[11] Patent Number: 5,884,316
[45] Date of Patent: Mar. 16, 1999

[54] IMPLICIT SESSION CONTEXT SYSTEM WITH OBJECT STATE CACHE

[75] Inventors: Philip Alan Bernstein, Bellevue; Brian Harry; Jason Lee Zander, both of Redmond, all of Wash.

[73] Assignees: Microsoft Corporation, Redmond, Wash.; Sterling Software, Inc., Dallas, Tex.

[21] Appl. No.: 752,328

[22] Filed: Nov. 19, 1996

[51] Int. Cl.[6] .................................................. G06F 15/173
[52] U.S. Cl. ...................... 707/103; 707/10; 395/200.33; 395/200.43; 395/683; 395/684
[58] Field of Search ................ 707/103, 10; 395/200.33, 395/200.43, 683, 684

[56] References Cited

U.S. PATENT DOCUMENTS

| | | |
|---|---|---|
| 5,287,507 | 2/1994 | Hamilton et al. ........................ 395/683 |
| 5,452,447 | 9/1995 | Nelson et al. ........................... 707/205 |
| 5,566,302 | 10/1996 | Khalidi et al. ........................... 395/680 |
| 5,590,334 | 12/1996 | Saulpaugh et al. ..................... 395/683 |
| 5,617,570 | 4/1997 | Russell et al. ........................... 395/684 |
| 5,657,447 | 8/1997 | Leung et al. ................................. 707/1 |

*Primary Examiner*—Thomas G. Black
*Assistant Examiner*—Jean R. Homere
*Attorney, Agent, or Firm*—Duft, Graziano & Forest, P.C.

[57] ABSTRACT

An implicit session system with an object state cache. The implicit sessioning avoids explicitly passing session parameters in each function call to an object by implicitly associating the session context to a session object with each loaded object related to the session so that each function call runs with the session context of the called object. The object state cache minimizes the system resource impact of having multiple instances of an object in different sessions by sharing one copy of each respective unique object state in an object state cache.

16 Claims, 4 Drawing Sheets

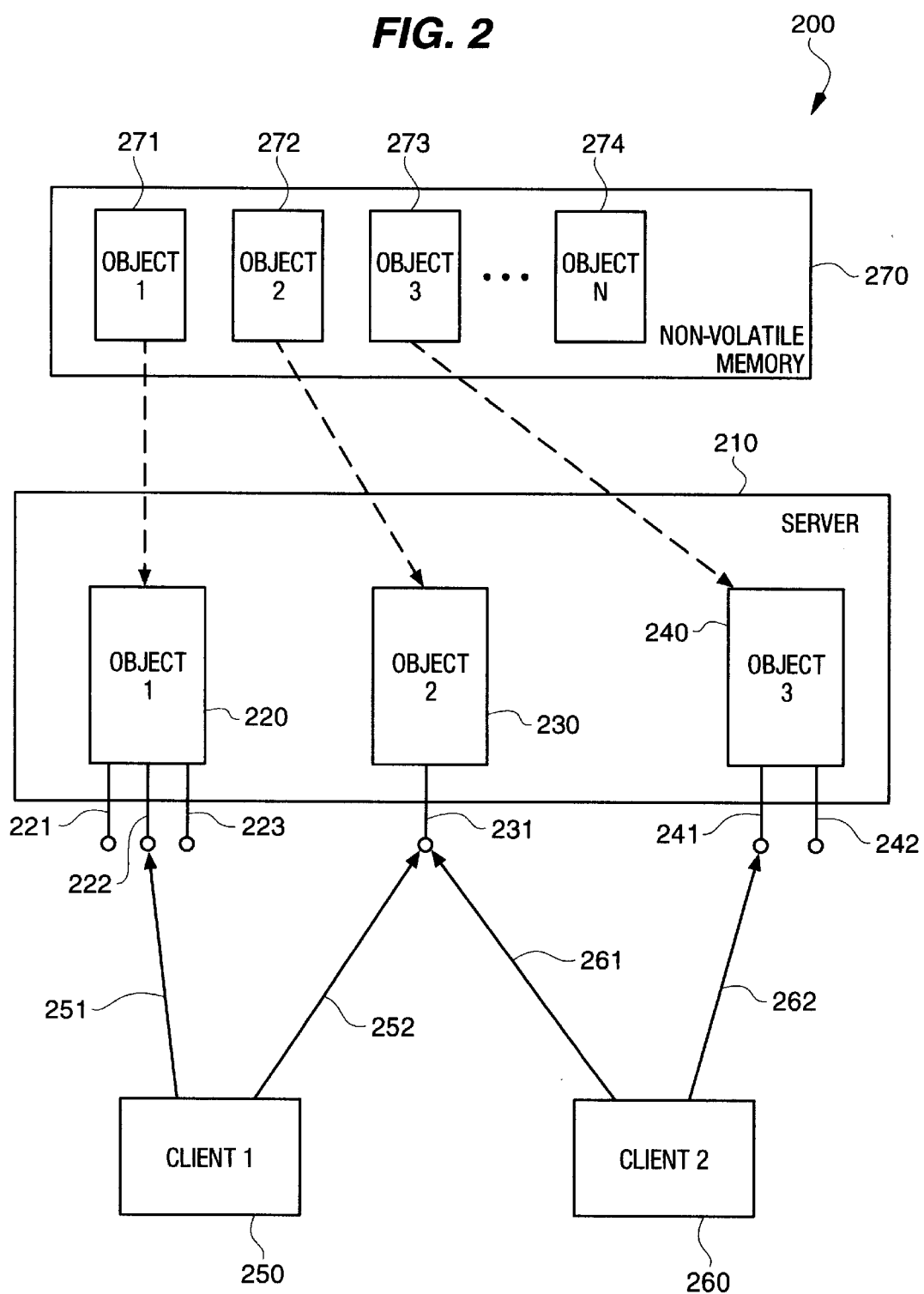

5,884,316

IMPLICIT SESSION CONTEXT SYSTEM WITH OBJECT STATE CACHE

FIELD OF THE INVENTION

The present invention relates to client/server computing systems, and in particular to object oriented implementations of a client/server computing system having implicit inheritance of a session object's context and an object state cache.

PROBLEM

A client-server software configuration is a well known and widely used architecture in the computing industry. Generally speaking, a server or server process is a computer program that supports a particular service or desirable features, and a client or client process is any one of several computer programs that interact with the server's service or features toward some useful end. Note that for purposes of the present level of discussion, client and server processes function independently whether they both reside on the same computer or on physically separate computers. Further, whether the client and the server are viewed as a single process within a system, as the same process from different functional perspectives, or as separate processes within a system, is beyond the scope of this discussion.

A communication or interaction between any one client and a server is typically referred to as a call. In a basic client-server configuration, when a client calls a server the client typically provides specific information about the service or feature that is the subject of the call. For example, in a database system where a client calls a server regarding a database access, the call might contain general information including, but not limited to, the name of the database and security parameters relevant to the client's ability to access the database in some predefined manner, in addition to transaction type and other information specific to that particular call. However, including such a quantity of general call information in each client-server communication has several disadvantages. First, the call is inefficient because much of the same information is repeated in each call. Second, the call is too verbose and therefore inconvenient for the programmer of the client. Third, new call parameters must be added to each call from the client to the server for each new general feature added to the server, such as a new security mechanism that requires a new security parameter.

One solution to the several disadvantages listed above is to reduce the amount of redundant information in each call from the client to the server. Reducing the amount of redundant call information has been accomplished in existing object-oriented client-server configurations by establishing a session object for each ongoing dialog of calls between any one client and the server. That is, a session is established as between a client and the server prior to the client making any calls to the server. Most importantly, much if not all of the otherwise redundant call information that must be communicated to the server on a call by call basis can now be communicated to the server only once via session parameters when the session is established. The session parameters can include, but are not limited to, a unique session identifier and a session state. The session identifier identifies the session being established, so it can be referenced in subsequent calls. The session state can include the details of the session such as, for example, the associated client's process identification, the name of an object being operated on by the client, services or features being used by the client, and security parameters relevant to the client's ability to use the server or operate on the object in some predefined manner. Once a session is established between a client and the server, the client can proceed to communicate with the server by way of calls that contain the appropriate session identifier and any other special information relevant to the specific call. Because the server already knows the session state for a call bearing a specific session identification, significantly less information must be passed from the client to the server in each call to the server. However, the session concept merely reduces but does not eliminate the client-server communication disadvantages previously cited. In fact the situation can be viewed as no better at all for client-server implementations that already have relatively few parameters in each call because the session solution requires the additional session identification parameter whose information is redundant across all calls for a given session. Therefore, for client-server implementations that handle significant numbers of calls from each of several clients to a server, even the reduction in call parameters by using the session solution does not significantly improve overall system performance.

For these reasons, it is desirable to have an alternative means and/or method to communicate information to the server about a client and the services and/or features being used by the client. The alternative means and/or method must be more efficient and lower impact than the existing session solution in terms of processing resources and overall system resources without an undesirable impact on the design and/or maintenance of the overall client-server system.

SUMMARY

Rather than explicitly passing a session identifier from the client to the server with each server call, the present invention implicitly associates each object in the server with a session so that every server call automatically runs with the session identifier of the object called. Eliminating the need to pass session identification information results in a more efficient call and a simplified object interface. Key to the invention is that 1) when loading an object into memory, the newly loaded object is associated with a session by a method on the session object itself or on another object that is already associated with a session; 2) a shared cache of object states exists so that if there are two objects representing the same persistent object only one copy of the state is required thereby eliminating memory intensive duplicate copies of object states for the same object loaded into memory by two different sessions; and 3) each object is partitioned into two parts so that all of the object's state is kept separately from its shell or header which simply identifies the object and points to its state.

The implicit session system with an object state cache is an object oriented system having a client and a server and comprises: generating a session object by a function call from the client to the server; establishing the session context as said session object for each object subsequently called by the client for a first time subsequent to the step of generating; and generating an object state in an object state cache pointed to by respective ones of objects generated subsequent to the step of generating the session object.

The implicit session system with an object state cache further comprises:

constructing a function call that is void of any session context intended for the purpose of session identification; delivering the function call from the client to a called object available to the client; and executing the function call by the called object with the session context of a session object that is associated with the client.

In preferred embodiments, the implicit session system with an object state is implemented in a database system or more particularly in a repository system.

DESCRIPTION OF THE DRAWING

FIG. 2 illustrates an object-oriented client/server interface in block diagram form;

DETAILED DESCRIPTION

Figure 1:
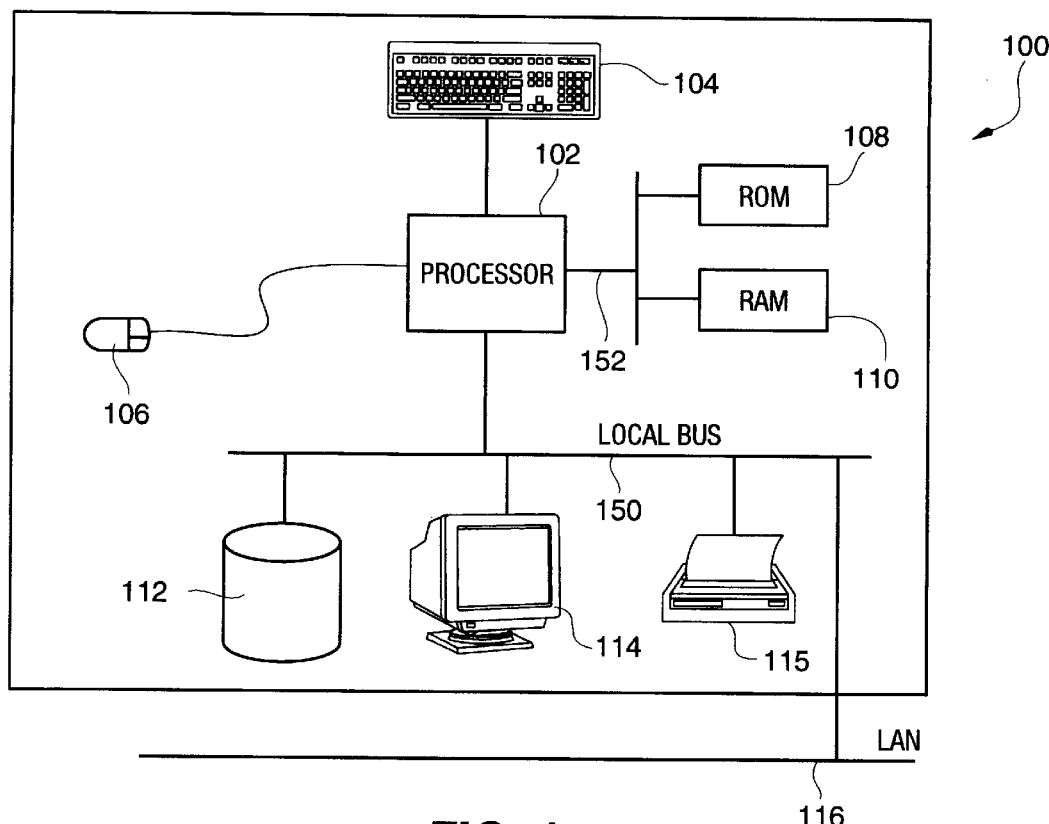
FIG. 1 illustrates a client and/or server computing environment example in block diagram form.

Computing Environment Example—FIG. 1

FIG. 1 illustrates a block diagram example of a computer system 100 useable by a typical client/server implementation. Programmed instructions for a client and/or a server, or any part of a client and/or a server, are executable on processor 102. Processor 102 stores and/or retrieves programmed instructions and/or data from memory devices that include, but are not limited to, Read Only Memory (ROM) 108 and Random Access Memory (RAM) 110 by way of memory bus 152. Another accessible memory device includes non-volatile memory device 112 by way of local bus 150. User input to computer system 100 can be entered by way of keyboard 104 and/or pointing device 106. Human readable output from computer system 100 can be viewed on display 114 or in printed form on local printer 115. Alternatively, computer system 100 is accessible from, and has access to, remote facilities by way of Local Area Network (LAN) 116 in a manner well known in distributed computing and the computer network arts. Thus, for purposes of this document it makes no difference whether a client and/or a server reside on computer system 100 or are distributed across multiple computer systems that are interconnected by way of LAN 116 or any other well known distributed computing facilities.

Object-oriented Client/Server Interface—FIG. 2

FIG. 2 illustrates a typical object-oriented client/server interface configuration 200 in block diagram form. Server 210 includes three objects 220, 230, and 240, each having a variety of methods, also known as member functions, that can be invoked by way of public interfaces 221–223, 231, and 241–242 respectively. A non-volatile memory 270 contains persistent copies 271–274 of each object from which each main memory or volatile memory server representation 220, 230, and 240 originate when an object is initially loaded. To make a persistent object accessible to programs, it must be "loaded" into volatile memory, meaning that it must be copied from persistent to volatile storage and translated into a format appropriate for program access. An object is typically loaded from non-volatile memory 270 into the server's volatile memory space 210 dynamically at the time of a function call to a method on a not yet loaded object, or expressly prior to the time a function call is made to a method on a not yet loaded object. Once an object is loaded the object need not be reloaded on subsequent function calls from the same client unless the object has been discarded in the mean time. Alternatively, "creating" an object is the process of bringing a volatile memory copy of an object into operational readiness or use. If an object being created is not yet loaded, then "creating" the object includes the step of loading. Creating an object is also known as instantiation.

The first client 250 has two interface pointers 251 and 252, also known as function calls to object interfaces, that point to public interfaces 222 and 231 respectively. The second client 260 has two interface pointers 261 and 262 that point to public interfaces 231 and 241 respectively. Details of the interface pointer and public interface relationship are illustrated in the text accompanying FIG. 3. Any client 250 and/or 260 can invoke the method or member functions of any object 220, 230, and/or 240 by making a function call to the desired public interface 221–223, 231, and/or 241–242 associated with the desired method.

One important architectural feature of objects in an object-oriented environment is that the internal implementation of a method is privately known only by the object, yet the interface to the method is publicly available to any client. Another important architectural feature of objects in an object-oriented environment is that every object has an identifiable set of properties and a state. Object properties include, but are not limited to, the data and/or content of the object, also known as the object's state.

Figure 3:
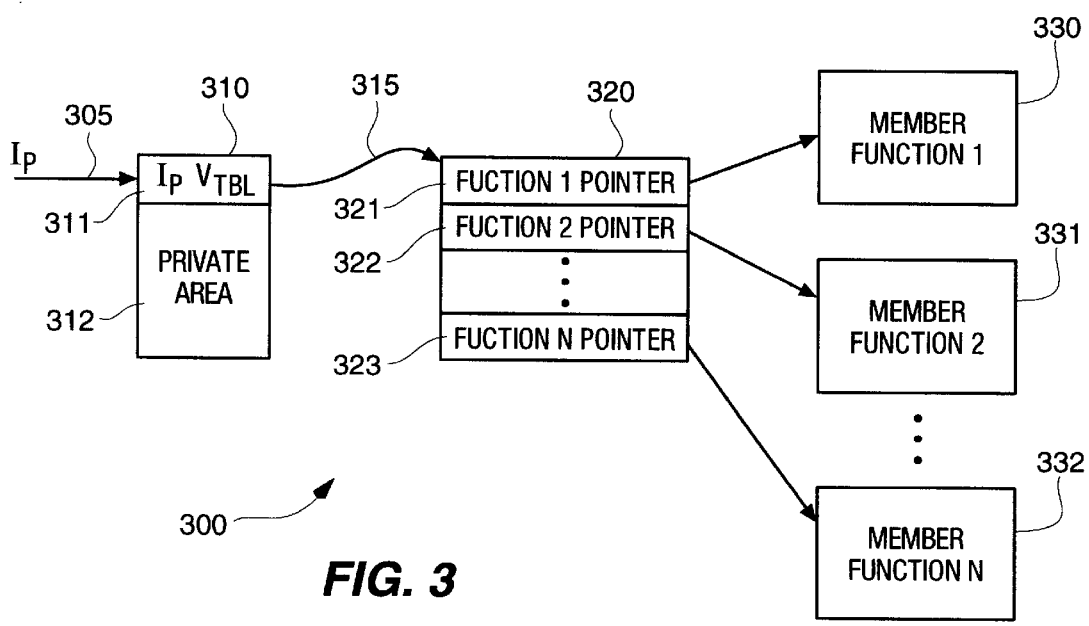
FIG. 3 illustrates an object-oriented interface pointer configuration in block diagram form.

Object-oriented Interface Pointers—FIG. 3

FIG. 3 illustrates the details of an object-oriented interface pointer configuration 300, also known as a function call to an object interface, in block diagram form. The relationship between an interface pointer and a public interface is a chain of pointers. One reason that the chain of pointers is important is because the reach of a function call from a client to a server may require the traversal across incompatible process and/or machine boundaries that require expressly stipulated language structures and/or specifically generated compiler code. However, a function call from a client to an object's generic public interface provides an environment to transparently intercept the function call with a "proxy" object that can forward the function call to the appropriate process and/or machine where the target object is running, in a manner that is independent of specific language and compiler restrictions.

The interface pointer 305 from the client is actually an interface pointer structure 310 that includes, but is not limited to, a pointer 311 to the proxy object known as a Virtual Function Table (Vtable) 320, and a private data area 312 for any data relevant to the function call such as parameters for example. Directed arrow 315 illustrates the Vtable pointer 311 that points from the interface pointer structure 310 to the Vtable object 320. Vtable 320 is the proxy object that is a table of pointers 321–323 to each specific member function implementation 330–332. Thus, the interface pointer 305 is a pointer to a pointer to the Vtable thereby providing seamless access for a function call from a client to an object in a server.

Given the context of the text accompanying FIGS. 2–3 and the general knowledge level of a person of modest skill in the object-oriented programming arts, the details of the present invention are readily apparent from the discussion below.

Figure 4:
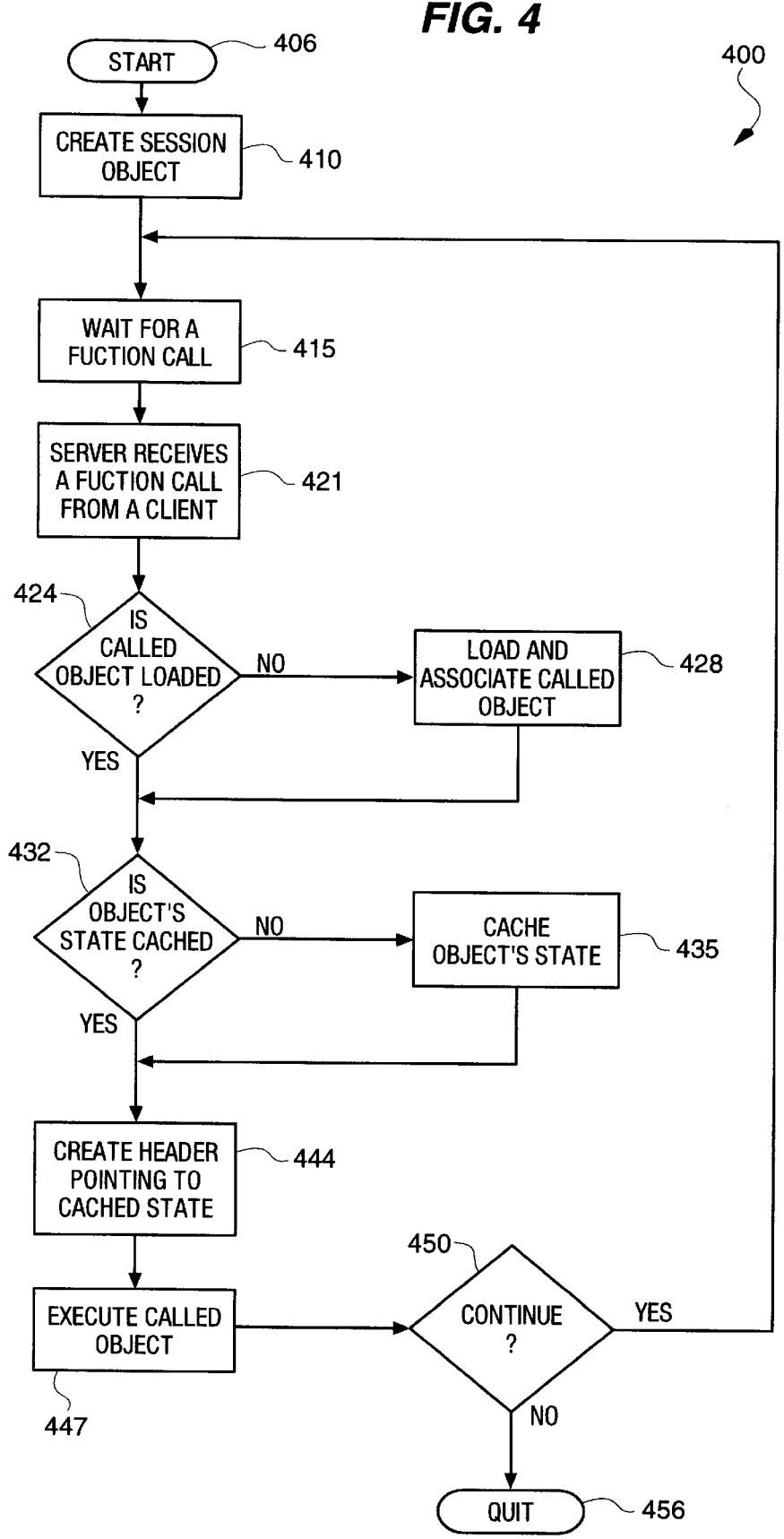
FIG. 4 illustrates an overview of operational steps for the implicit session system in flow diagram form.

Implicit Sessions Operational Steps—FIG. 4

FIG. 4 illustrates an overview of operational steps 400 for the implicit session and state caching system in flow diagram form. The operational steps 400 begin at step 406 and proceed to step 410 where the calling client creates a session by way of a function call to the server. For example, because the server itself is an object, a function call can be made on the server's method "CreateSession", or some similarly functional method, that returns an empty session object to the client.

At step 415 the client/server system continues to operate as designed until such time as the client for the newly created session object makes a function call to a method on an object supported by the server. When such a function call is made by the client, the server receives the call at step 421. If at decision step 424 the called object is not loaded, then processing continues at step 428 where a representation of the called object is loaded from a non-volatile memory copy into the volatile memory of the session object created by the calling client. Most importantly is that the object being loaded at step 428 is immediately associated with the session object so that all objects serving this client have the same session identification and any function call to these objects will automatically run with the session identifier of the called object. Immediately associating a loaded object with a session object is accomplished by requiring that an object only be loaded by a function call to a method on the session object or on another object that is already associated with the session object. Thus, any newly loaded object is implicitly associated with a session and the need to explicitly pass session identification information in a function call is eliminated.

Once a called object is loaded or is verified as being loaded, processing continues to step 432. Step 432 begins an important phase of the function calling process known as object state caching. As a matter of background prior to discussing the actual object state caching steps, it is important to note that an object can be partitioned into up to three parts including, but not limited to, the public interfaces and private implementation, as previously discussed, in addition to the object's state. The object's state can be separated from the rest of the object so that only the object's header, also known as its shell, points to the object's state. The ability to separate an object's state from the object itself is significant for the following reasons. In existing object-oriented systems, if an object from non-volatile memory is loaded into volatile memory by two different sessions, then there will be two identical objects in the typically less plentiful volatile memory representing the same persistent object original. First, this is an inefficient use of volatile memory. Second, it is difficult for any system to keep the two session copies of the object identical as is required by accepted object oriented programming standards. However, this problem can be avoided if the two different sessions were to share the common object's state. Sharing an object's state between two or more sessions saves volatile memory space because very little memory is required to store an object and its header pointer to the accompanying state. Further, having only one copy of an object's state eliminates the need to maintain identical copies of the object's state. For example, in a database implementation a database object can be stored as a row of a database table, and when the object is loaded, the object's header is merely made a pointer to the program that describes the object's behavior and a pointer to a row in memory that contains the object's state.

Returning to the operational flow diagram, if it is determined at decision step 432 that the called object's state is not yet cached, then processing continues at step 435 where the object's state is cached. If the object's state has just been cached or if it is determined at decision step 432 that the object's state has already been cached, processing continues to step 444 where a header is created to point to the cached state. The object state cache is typically a volatile memory space.

Now that the called object is loaded and a pointer is created to point to the appropriate state, the called object is executed in the ordinary course of processing at step 447. If additional client/server processing is to continue at decision step 450, the processing continues at step 415 in the manner previously disclosed. Alternatively, if additional client/server processing is not to continue at decision step 450 the processing stops at step 456.

Figure 5:
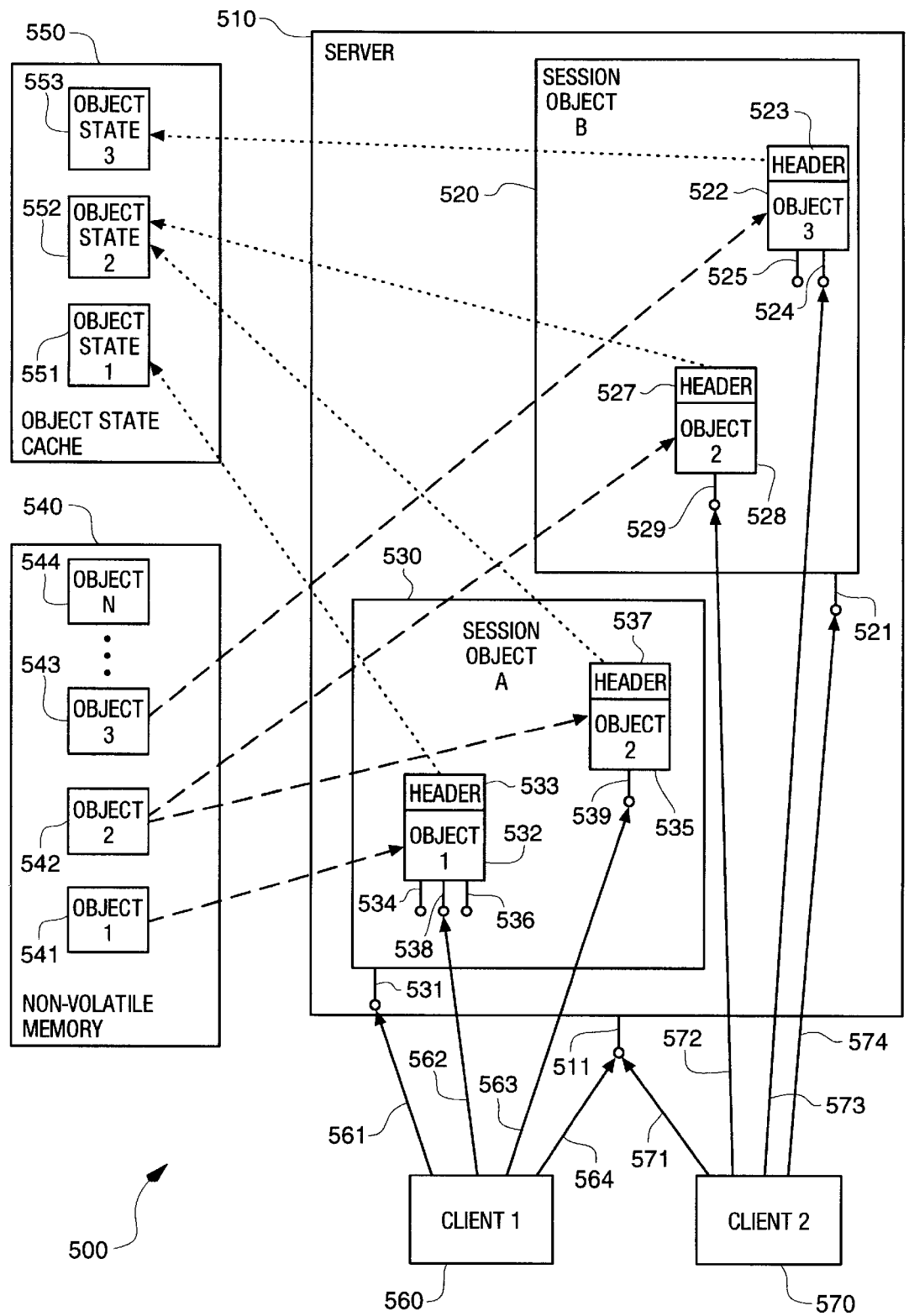
FIG. 5 illustrates an implicit session association client/server configuration with object state cache in block diagram form.

Implicit Session and Object Caching Configuration—FIG. 5

FIG. 5 illustrates an implicit session client/server configuration 500 with object state cache 550 in block diagram form. Server 510 is an object in volatile memory having at least one member function 511. Non-volatile memory 540 contains persistent representations of objects 541–544. Object state cache 550 is typically a volatile memory that contains object states 551–553 for the volatile memory copies of objects 532 and 535 in session object 530, and objects 528 and 522 in session object 520. Object 532 has three public interfaces 534, 536, and 538, and a header pointer 533 pointing to object state 551. Object 535 and 528 originate from the same persistent object 542 and each have an individual public interface 539 and 529 respectively, and header pointers 537 and 527 respectively that both point to a shared object state 552. Object 522 originates from persistent object 543 and has two public interfaces 524–525 and a header pointer pointing to object state 553.

Client 560 is illustrated as having made function calls 561–564 to methods on objects 510, 530, 532, and 535 respectively. Function call 564 from client 560 to public interface 511 on server object 510 returns a session object 530. Function call 561 to public interface 531 on session object 530 can be used to cause an object to load from non-volatile memory in a variety of manners. For example, given a session object 530 a database object can be identified for loading by indicating a unique object identifier such as a name, or a path or file system name, or a well known location such as the root object of the database. The aforementioned manner of loading an object from a session object is manifested as a method on a session instance.

Function calls 562 or 563 to the public interfaces 538 or 539 on either object 532 or 535 can also be used, for example, to reference another object and cause the referenced object to load. For example, consider an employee database with an employee object O1 having the session context of session object SO1. Assume that object O1 has a property, also known as an attribute, called Manager and whose value is another employee object O2. Referencing the Manager(Employee) property of object O1 would cause the loading of a second object O2 that has the same session context as object O1. Thus, object O2 has the context of session object SO1 by way of a pointer back to session object SO1.

Another way one object can reference and load another object is for an object to have a collection-valued property where the members of the collection are themselves objects. Referencing the collection and a specific member within the collection will cause the member object to load with the same session context as the object having the collection-valued property. One further way one object can reference and load another object is when a function call to a first object triggers an event thereby causing yet another object to be created and loaded to process the event. The object processing the event is created with the same session context as the object that triggered the event.

Client 570 is illustrated as having made function calls 571–574 to methods on objects 510, 520, 528, and 522 respectively in a manner having similar effect as disclosed in the above discussion for client 560. Note that persistent object 542 from non-volatile memory 540 has been loaded in session 530 and session 520 as object 535 and 528 respectively. However, the savings in memory and in state consistency is realized by header pointers 537 and 527 of objects 535 and 528 which point to a common object state 552 in object state cache 550.

SUMMARY

The implicit session system with object state cache avoids explicitly passing session parameters in each function call to an object by implicitly associating the session context with each loaded object related to the session so that each function call runs with the session context of the called object. Further, the system resource impact of having multiple instances of an object in different sessions is minimized by sharing one copy of each object state in an object state cache. Although specific embodiments are disclosed herein, it is expected that persons skilled in the art can and will design alternative object-oriented implicit session systems that are within the scope of the following claims either literally or under the Doctrine of Equivalents.

What is claimed is:

1. A computer readable medium containing computer executable instructions to perform a method for implicitly passing session context in an object oriented system having a client and a server, said method comprising:

constructing a function call that is void of session identification information;

delivering said function call from said client to a called object; and executing said function call with a session context of a session object that is inherent to said called object.

2. A method according to claim 1 wherein said session context includes a session identifier.

3. A method according to claim 1 including:

first step of generating said session object for said client in response to a session object function call from said client to said server; and establishing said session context as a context for each of at least one object created for a first time on behalf of said client subsequent to said first step of generating said session object.

4. A method according to claim 3 including:

second step of generating a unique copy of an object state in an object state cache for an object that is loaded for a first time on behalf of a first client; and third step of generating a private header pointer to said object state for each occurrence of said object that is loaded on behalf of any client subsequent to said second step of generating said object state.

5. A method according to claim 1 wherein said object oriented system is a database system.

6. A method according to claim 5 wherein said database system is a repository system.

7. A computer readable medium containing computer executable instructions to perform a method for implicitly passing session context in an object oriented system having a client and a server, said method comprising:

first step of generating a session object having a session context wherein said step of generating said session object occurs in response to a session object function call from said client to said server;

establishing said session context as a context for each of at least one object created for a first time on behalf of said client subsequent to said first step of generating said session object;

second step of generating a unique object state in an object state cache for each of at least one object that is loaded for a first time by any client; and pointing to said unique object state from a private header pointer in each of said at least one object that is loaded subsequent to said second step of generating said unique object state.

8. A method according to claim 7 including:

constructing a function call that is void of session identification information;

delivering said function call from said client to a called object; and executing said function call with said session context of said session object that is inherent to said called object.

9. A method according to claim 8 wherein said session context includes a session identifier.

10. A method according to claim 7 wherein said object oriented system is a database system.

11. A method according to claim 10 wherein said database system is a repository system.

12. A computer readable medium containing computer executable instructions to perform a method for implicitly passing session context in an object oriented system having a client and a server, said method comprising:

first step of generating a session object having a session context wherein said step of generating occurs in response to a session object function call from said client to said server;

establishing said session context as a context for each of at least one object created for a first time on behalf of said client subsequent to said first step of generating said session object;

constructing a function call that is void of session identification information;

delivering said function call from said client to a called one of said at least one object; and executing said function call with said context of said called one of said at least one object.

13. A method according to claim 12 wherein said session context includes a session identifier.

14. A method according to claim 12 including:

second step of generating an object state in an object state cache for each of said at least one object that is loaded for a first time on behalf of a first client; and third step of generating a header pointer to said object state for each occurrence of said at least one object that is loaded on behalf of any client subsequent to said second step of generating said object state.

15. A method according to claim 12 wherein said object oriented system is a database system.

16. A method according to claim 15 wherein said database system is a repository system.

* * * * *